(12) United States Patent
Preston

(10) Patent No.: US 7,107,218 B1
(45) Date of Patent: Sep. 12, 2006

(54) METHOD AND APPARATUS FOR PROCESSING QUERIES

(75) Inventor: Keith R Preston, Woodbridge (GB)

(73) Assignee: British Telecommunications public limited company, London (GB)

( * ) Notice: Subject to any disclaimer, the term of this patent is extended or adjusted under 35 U.S.C. 154(b) by 834 days.

(21) Appl. No.: 10/089,445

(22) PCT Filed: Oct. 23, 2000

(86) PCT No.: PCT/GB00/04081

§ 371 (c)(1),
(2), (4) Date: Mar. 29, 2002

(87) PCT Pub. No.: WO01/31500

PCT Pub. Date: May 3, 2001

(30) Foreign Application Priority Data

Oct. 29, 1999 (EP) ................... 99308627

(51) Int. Cl.
*G10L 21/00* (2006.01)
*G06F 17/30* (2006.01)

(52) U.S. Cl. .................. 704/270; 707/3; 707/100

(58) Field of Classification Search ................ None
See application file for complete search history.

(56) References Cited

U.S. PATENT DOCUMENTS

| | | |
|---|---|---|
| 4,724,523 A | 2/1988 | Kucera |
| 5,404,295 A | 4/1995 | Katz et al. |
| 5,724,571 A * | 3/1998 | Woods .......................... 707/5 |
| 6,311,194 B1 * | 10/2001 | Sheth et al. ................. 715/505 |
| 6,519,603 B1 * | 2/2003 | Bays et al. .................. 707/102 |
| 6,601,026 B1 * | 7/2003 | Appelt et al. ................... 704/9 |
| 6,647,383 B1 * | 11/2003 | August et al. ................. 707/3 |
| 6,665,644 B1 * | 12/2003 | Kanevsky et al. .......... 704/275 |
| 6,745,161 B1 * | 6/2004 | Arnold et al. .................. 704/7 |
| 6,910,003 B1 * | 6/2005 | Arnold et al. .................. 704/4 |

FOREIGN PATENT DOCUMENTS

EP 0609517 A2 8/1994

OTHER PUBLICATIONS

Kawtrakul et al, "Anaphora Resolution Based on Dynamic Context Model in Database-Oriented Discourse", Nagoya University, Nagoya, Japan, XP002238772, p. 808-824, Nov. 11, 1989.

* cited by examiner

*Primary Examiner*—Susan McFadden
(74) *Attorney, Agent, or Firm*—Nixon & Vanderhye P.C.

(57) ABSTRACT

Queries which may be expressed in natural language are processed by: decoding a query into one or more semantically meaningful query elements; accessing data storage, which data storage includes at least one annotation element and one or more corresponding data entries: identifying annotation elements in accordance with the semantically meaningful query elements; and retrieving at least one data entry corresponding to each identified annotation element.

19 Claims, 15 Drawing Sheets

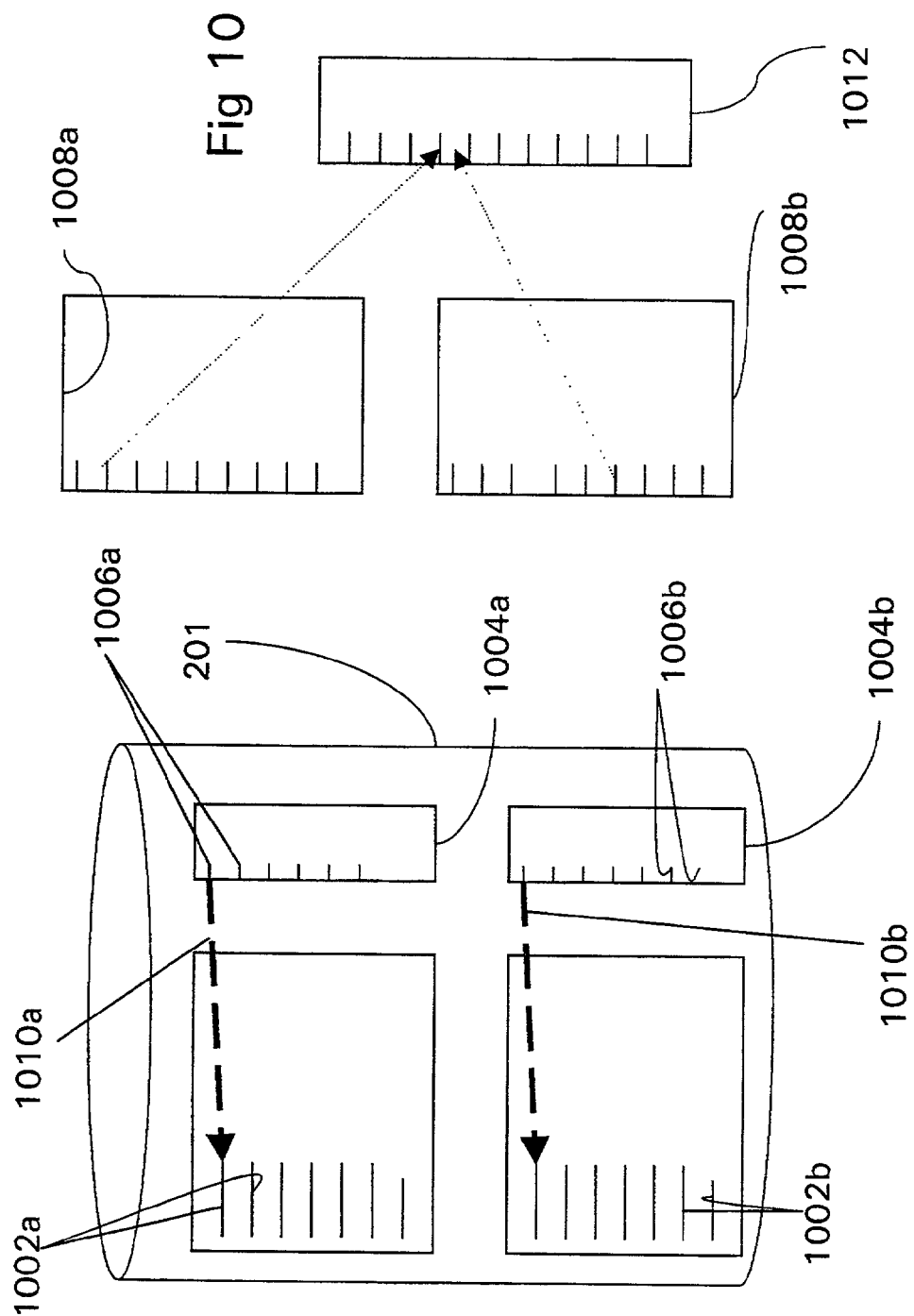

METHOD AND APPARATUS FOR PROCESSING QUERIES

This application is the US national phase of international application PCT/GB00/04081 filed Oct. 23, 2000 which designated the U.S.

BACKGROUND

1. Technical Field

The present invention relates to a method and apparatus for processing queries and is suitable particularly, but not exclusively, for inputting queries to, and receiving information from, a database.

2. Related Art

The gathering and disseminating of information now forms a vital part of many business processes. These activities usually fall into three parts:

Collect, filter and sort raw information; understand the information, make recommendations based thereon; explain and communicate these recommendations to people. The issues involved in the first stage, that of information gathering, have received a great deal of attention, and continue to be the subject of considerable research around the world. In comparison, the third state, where information is communicated to others, has received relatively little attention. As the transfer of information is often a continuation of significant efforts in the early stages of information dissemination, there is a significant impetus to build on these efforts so that any preliminary work is not wasted. It is vital that the results of such a third state are presented in clear and accessible formats so that recipients of information can derive maximum benefit from the information.

Traditionally, information has been presented through reports. Recent technological developments such as the Internet and intranets have made it much easier to distribute such sources of information, but this benefit of accessibility incurs problems associated with the increased volume of information. Thus there is now such a huge amount of material available that it is difficult to know what is relevant and accurate. Search engines provide a means of retrieving documents that contain particular keywords, or a predetermined combination of keywords, but search results do not include any real measure of how a retrieved document content relates to the keywords. This is mainly a result of the way that documents, which may be books, articles, WWW pages, videos and presentation slides etc. are conceived. These documents often address specific issues or questions, and are typically written for a specific audience. Thus the context of the documents may be vastly different from that of interest to an initiator of a search, despite the fact that there is an overlap of keywords.

There are several systems available that attempt to manage information available from these data sources, and software agents in particular are known to manage information in various predetermined ways. Each agent generally comprises functionality to perform a task or tasks on behalf of an entity (human or machine-based) in an autonomous manner, together with local data, or means to access data, to support the task or tasks. For instance, an information agent might select documents of relevance to a topic or user. A general comprehensive review of agent-based technology is given by Hyacinth S. Nwana, "Software Agents: An Overview" in the *Knowledge Engineering Review* journal, Vol. 11, No. 3, pages 205–244.

In the Applicant's co-pending international Patent Application Number WO96/23265, there is described a software agent particularly for use in information management. The agent, known as "JASPER", is associated with a user's Internet browser and alerts the user to documents of interest to them. To do that, JASPER uses a keyword set for the user concerned. However, by using clustering techniques, JASPER can extend the keyword set to pick up documents that would not have been located otherwise.

There are also tools known for processing the information itself, such as the PROSUM information summariser described in the applicant's co-pending European patent application number 97302616.4. This summarises information in accordance with a user's particular interest rather than simply in accordance with the content of the document. Hence a user looking at the results of a search and reading the summary produced by PROSUM will be alerted to a document in which the user's interest is represented by only a reference within the document, the document being principally about something else. Such documents tend not to be picked up by more conventional search tools.

Applicant's co-pending Patent Application Number WO99/21108 teaches a system that retrieves objects, such as documents, based on the keyword extraction disclosed in JASPER, and these objects are automatically stored in a database and entered against a user's, or a project's profile. The relationship between any documents so retrieved may be estimated based on criteria such as keyword occurrence, and this estimate is displayed graphically to the user. Access to these documents is a function of information supplied in the respective profiles such that, for example, groups of personnel may automatically be informed of information according to their project group, grade or a security rating as specified in the profiles.

Search engines that are used to search for documents include Yahoo, Alta Vista and Ask Jeeves, among others. The first two, Yahoo, and Alta Vista, search a list of keywords accompanying their index of documents for keywords that match the keywords input by the user. The search is purely a function of keyword 'hits', although at least some of these engines process the query to stem it to its root form. The third system, Ask Jeeves, allows users to phrase queries in natural language rather than entering keywords, and the subsequent search proceeds based on keyword occurrence in the same way as described with respect to the Yahoo engine. Another type of search system is provided by Whatis, which retrieves a text entry in response to a search query; in this system the search is performed on single keywords, and the system displays dictionary entries that correspond to the keywords. The first three of these search facilities discussed above, Yahoo, Alta Vista and Ask Jeeves, provide a user with exactly the problems disclosed above: the user does not know how relevant the document is to his query. The fourth search facility, Whatis, provides a link to single data entries, thus functioning as an electronic paper dictionary, and its use is extremely limited.

U.S. Pat. No. 5,404,295 describes a storage and retrieval system for retrieving selected passages in documents, database entries and the like. These selected passages (subdivisions) are linked to one or more annotations by pointers, and the annotations are stored in a database for querying. Incoming queries are examined against the annotations, in order to identify one or more annotations relevant thereto. When one or more annotations have been identified, the subdivisions relating thereto are retrieved and presented to the user. The presentation and chaining together of subdivisions is implicit in the way in which the annotations and pointers thereto are constructed.

BRIEF SUMMARY

According to a first aspect of the present invention there is provided a method of presenting information to a user in respect of a query. The method comprises the steps of:
(i) decoding the query into one or more semantically meaningful query elements;
(ii) accessing annotation elements stored in a first data store;
(iii) comparing a semantically meaningful query element from step (i) with the annotation elements so as to identify at least one annotation element that matches the semantically meaningful query element;
(iv) retrieving a plurality of data entries corresponding to the identified annotation element(s), each of the plurality being stored in a second data store; and
(v) presenting the plurality of retrieved data entries to the user;

characterised by presenting the retrieved data entries in accordance with discourse criteria and preferences of the user.

Advantageously the preferences of the user are stored as templates, each of which gives a default ordering for presentation of the data entries.

Conveniently there is provided an apparatus corresponding to the method described above.

Semantically meaningful elements in the context of the following description may be defined by means of the following example: "The cat sat on a mat":

a) meaningful semantic entities, typically denoted by nouns. For example the semantic entities are "cat", "and "mat".

b) the form of each of the entities (e.g. whether it is singular or plural), and whether it is in the definite or indefinite form. In the example, "the cat" is singular, and "the" indicates that it is the definite article. "Mat" is singular, and "a" indicates that it is in the indefinite form.

c) "States of affairs"—generally indicated by verbs. States of affairs indicate either actions, as most verbs do, or states of being (e.g. the verb "to be"). In this example, "sat" is a state of affairs.

d) The conditions attached to each state of affairs (e.g. the tense of the verb concerned)

e) Modifiers (e.g. adverbs or adjectives) which ascribe properties or otherwise modify an entity or state of affairs.

f) The linkages between the occurrences of the foregoing (e.g. which entities a state of affairs affects and how; and which entities or state of affairs a modifier modifies).

Further, in the following description, a "user" is not necessarily limited to a human entity, as it might well be another piece of equipment or a software agent.

In the context of the present invention, "data entries" include any information whether presented in words, images or computer code for instance, and would include a computer file or a computer program, internet pages, electronic mail documents, text files, word-processed documents, or multimedia objects such as movie, picture or sound files. In the following description, "data entries" are described as content, content data, information and text entries, and each of these terms is of equivalent scope to that of "data entries".

BRIEF DESCRIPTION OF THE DRAWINGS

Embodiments of the invention will now be illustrated, by way of example only, with reference to the accompanying drawings, in which:

FIG. 10 is a block diagram showing an arrangement of lexical components according to a fourth embodiment;

DETAILED DESCRIPTION OF EXEMPLARY EMBODIMENTS

Overview

Figure 1:
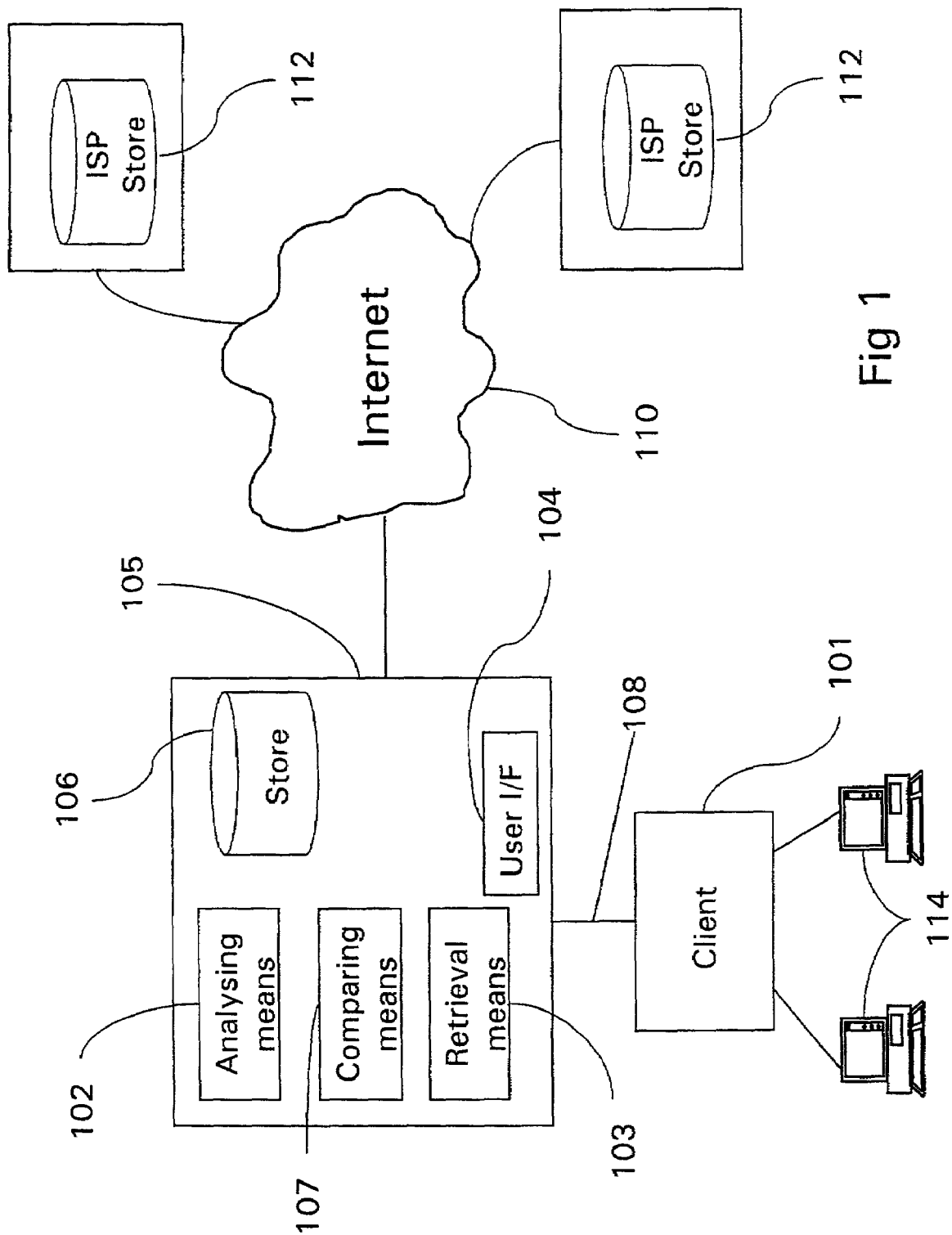
FIG. 1 is a schematic diagram showing apparatus for inputting queries to, and receiving information from, a database according to the present invention.

Referring to FIG. 1, an embodiment of the apparatus for inputting queries to, and receiving information from, a data source is shown divided into 5 functional parts:

SERVER
STORAGE
DATA ANALYSIS
USER INTERFACE
RETRIEVAL

The SERVER computer 105 receives input from a client terminal 101 via a communications network 108 and interfaces with the internet 110. Information about the Internet can be found, for example, from books listed on the Internet at Universal Resource Locator (URL)

http://www.boutell.com/faq/books htm

The server computer 105 may thus be additionally connected to external data stores 112 via the internet 110. The terms "client" and "server" are illustrative but not limiting to any particular architecture or functionality.

The STORAGE 106 functional part of the apparatus is located on the server 105 and includes one or more data stores containing data entries, annotations, multilingual lexicons, and stores for linguistic, semantic and syntactic information.

The DATA ANALYSIS functional part of the apparatus is located on the server 105 and includes analysing means 102 and comparing means 107 for analysing and resolving input queries. The present invention may be used to provide information to a user in response to a query formulated in natural language, which may be entered at the keyboard of the client terminal 101 for submission via the user interface 104 to the server 105. The analysing means 102 decodes the query into one or more semantically meaningful query elements, and the comparing means 107 then identifies annotations from the data store 106 corresponding to the processed query elements.

The RETRIEVAL functional part of the apparatus is located on the server 105 and includes retrieving means 103. Once annotations have been identified from the data store 106, they are then used by retrieval means 103 to retrieve one or more data entries, which entries are located in the data store 106.

The USER INTERFACE functional part of the apparatus provides an interface to each of a number of Users 114 by means of a World Wide Web (WWW) Browser interface 104.

These five functional units inter-operate in the following manner:

The storage 106 contains data entries in a knowledge base, together with annotations that are linked to the data entries. When a query is entered to via the user interface, the query is analysed to reduce it to the form of an annotation and this is compared with annotations in the store 106 in order to find a closest matching existing annotation. As the annotation is linked to the data entries, once an annotation is identified, the one or more corresponding data entries are located in the knowledge base.

First Embodiment

Figure 2:
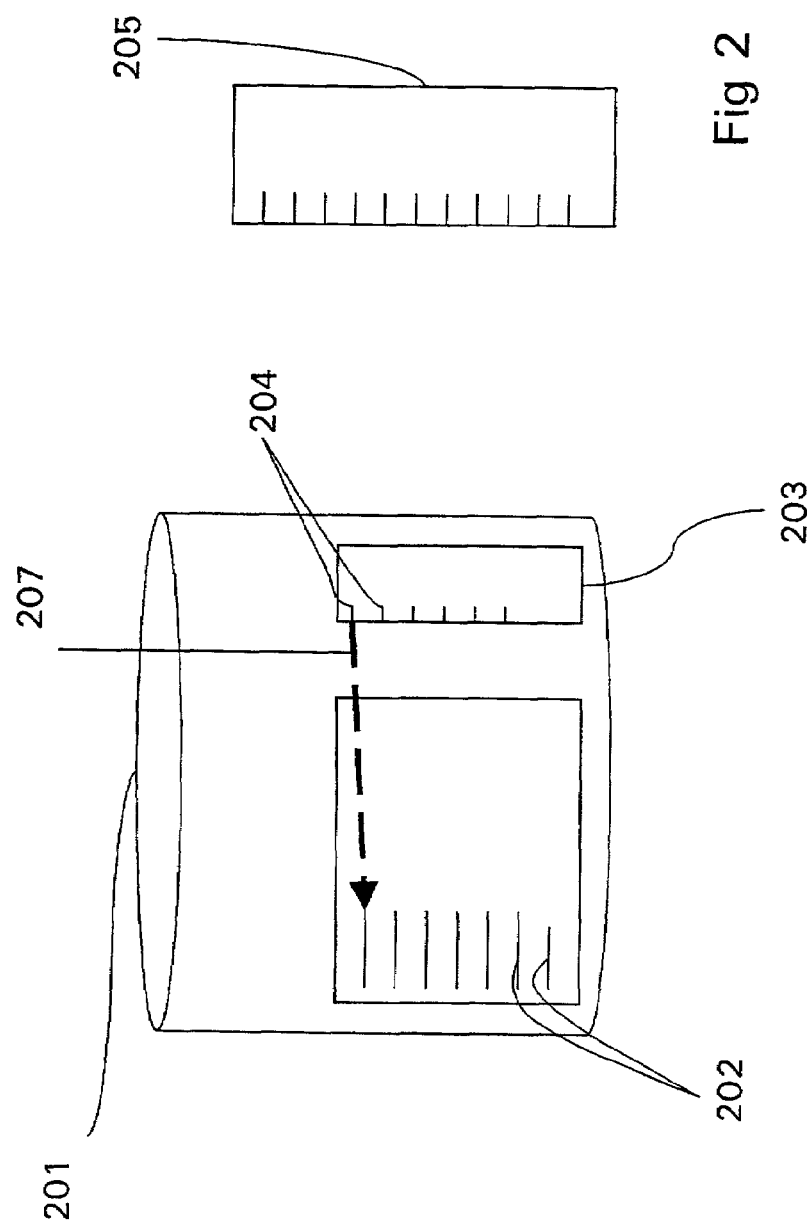
FIG. 2 is a block diagram of the apparatus of FIG. 1, showing the arrangement of the data store.

Referring to FIG. 2, in a first embodiment of the present invention, the storage 106 may include a first data store 201, which may be a database comprising pre-entered data entries 202, together with a list 203 of annotations 204 that correspond to these entries. The list 203 of annotations is also stored in a second data store 205, which may be organised as an index listing of the annotations, and the annotations are organised in "encyclopaedia index" form, i.e. entries take the general form of "A,B,C,D, . . . N" where A is the subject and B, . . N are properties of that subject. E.g.:

"genetically modified food, safety" in "A, B" format

"food, genetically modified, safety" in "A, B, C" format

The annotations 204 are used to provide a pointer to, or to "index on" 207, the data entries 202. The first data store 201 may be called a natural language knowledge base (NLKB), as it comprises data entries of information expressed in natural language.

Data Query:

The decoding and identifying processes performed by the analysing and comparing means 102, 107 may be illustrated with reference to FIGS. 3 and 4 of the accompanying drawings by means of the following example query "Who runs ACR":

S4.1 Decompose the query into a form of question (S4.2) and the meaning of the question (S4.3) in the query analyser 302;

S4.2 FORM OF QUERY: In order for the user to receive an answer that is compatible with the format of the query, the query analyser 302 analyses the form of the reader's input, and indicates the form the answer is to take. For example, a question of the form "What is X" would ideally be answered with a brief response of the type that you might expect to find in a dictionary. On the other hand, a question like "Tell me all about X", would naturally elicit a lengthier response with more explanation. The result of this analysis is stored temporarily and used to influence the matching process described in S4.4;

S4.3 MEANING OF QUERY: The meaning of the question "Who runs X", where X is the subject (ACR), is analysed:

S4.3.1 Query analyser 302 transforms the abbreviation "ACR" from the query into possible full forms, and locally stores all full forms for later processing;

S4.3.2 Query analyser 302 analyses the question for a semantic representation of the subject. The verb "runs" is decomposed into its base form A, where A is the property of the subject. In this example, the base form is "run" and this base form is looked up to find synonyms, along with semantically equivalent forms using derivational morphology in a linguistic store 300, giving a list of properties such as runner, manager, management, director, controller, etc.

S4.4 Pattern Matcher 304 matches the two parts of the analysis, the subject and its property, against the annotations 204. Thus "ACR, manager" (for each of the hits against "ACR") will be matched against the annotations 204 in the list 205 by standard pattern matching techniques (see example below). The form of the query may affect the matching process. For example, the pattern resulting from the query "Tell me about ACR" may be "ACR, *" where "*" indicates a wildcard which can match anything.

Example of pattern matching, using the programming language Perl, version 5:

```
# Example: the pattern is of the form that would correspond to
# the question "Who runs Cosmology Integration ?"
$index=<<EndOfIndex;
Advanced Cosmology Research
Advanced Cosmology Research, function
Advanced Cosmology Research, manager
Advanced Cosmology Research, location
Advanced Cosmology Research, organisation
Cosmology Integration
Cosmology Integration, function
Cosmology Integration, manager
Cosmology Integration, location
Cosmology Integration, organisation
EndOfindex
$pat1="Cosmology Integration, (?:manager|controller|director)";
print "Pattern 1 matches:\n";
match($index,$pat1);
```

The matching may be performed by the following routine:

```
match {
    my ($ind,$pat)=@_;
    my @matches=($ind=~/^($pat);$/mg):
    print join("\n,@matches), "\n\n";
}
```

Figure 3:
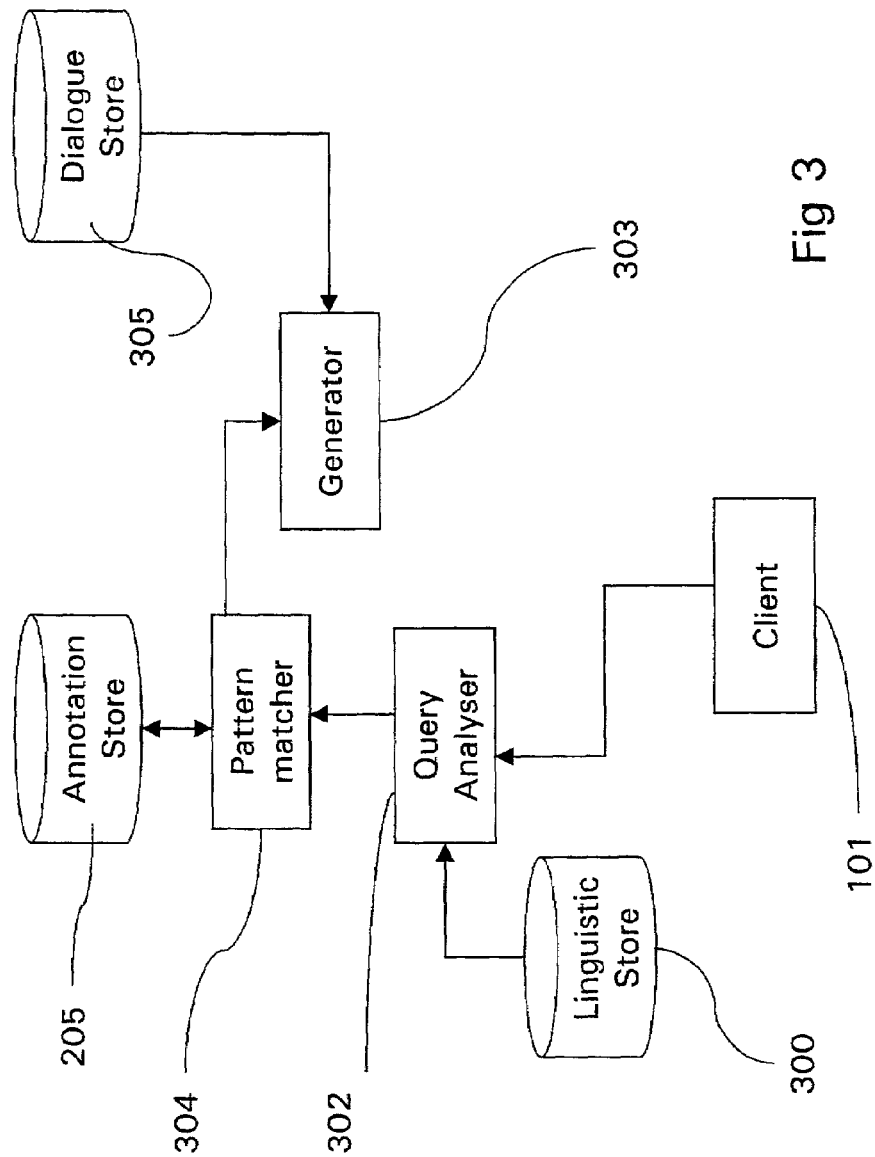
FIG. 3 is a block diagram of the apparatus of FIG. 1, showing the components comprising the analysing means according to the first embodiment.
Figure 4:
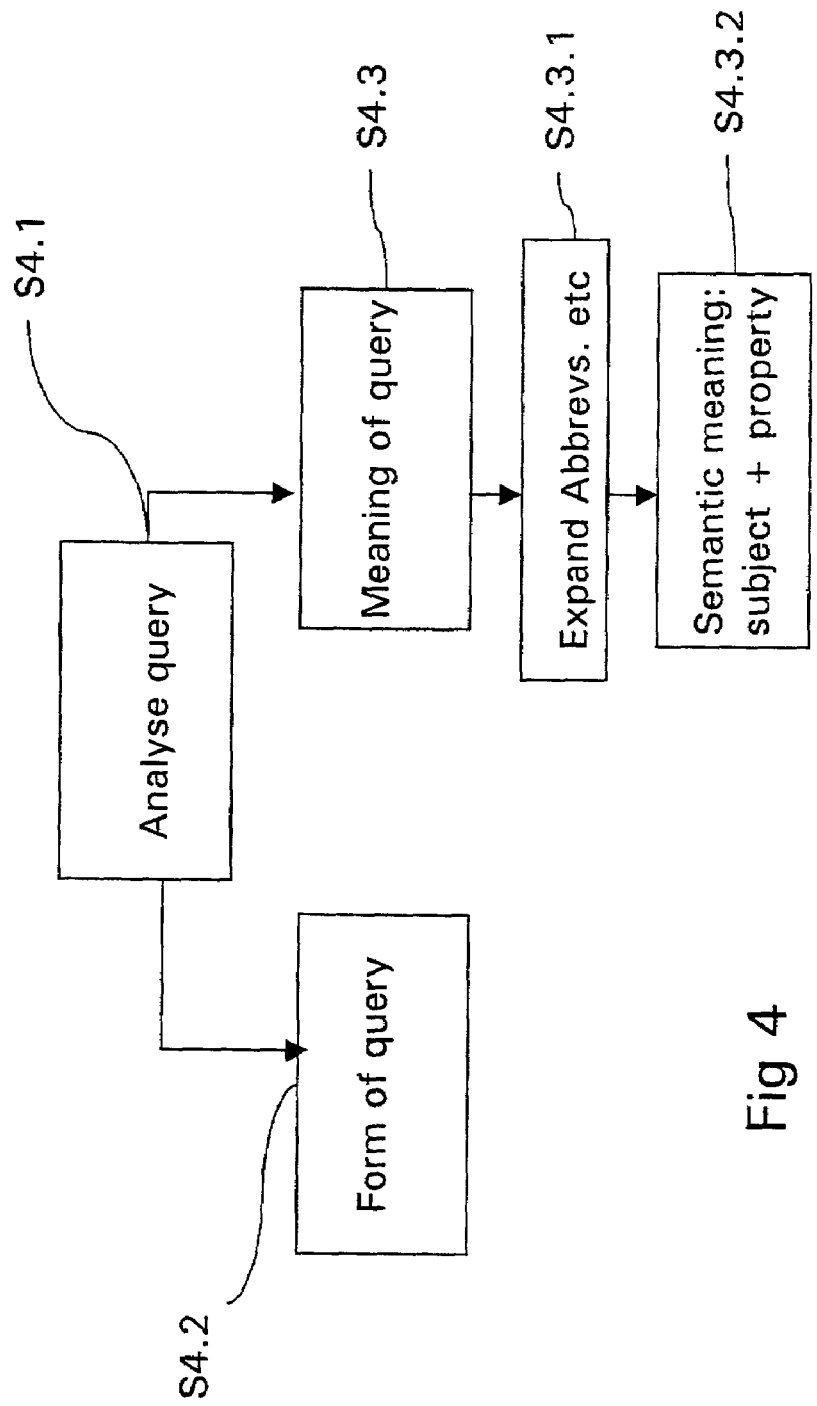
FIG. 4 is a flow diagram of query processing performed by the analysing means of FIG. 3.

After queries have been matched against annotations in the list 205 (S4.3.2) by the pattern matcher 304, the matched annotations are input to generator 303 shown in FIGS. 2 and 3, which retrieves a corresponding data entry from the NLKB 201. The generator 303 thus provides the retrieval means 103. If there is more than one annotation that matches the user query, the order in which these data entries are retrieved is specified by the order of entries in the annotation index. The index may be arranged alphabetically, with sub-headings corresponding to each subject:

e.g.

Advanced Cosmology Research

Advanced Cosmology Research, function

Advanced Cosmology Research, location etc.—as encyclopaedia entries.

Advanced Cosmology Research, manager

Figure 5:
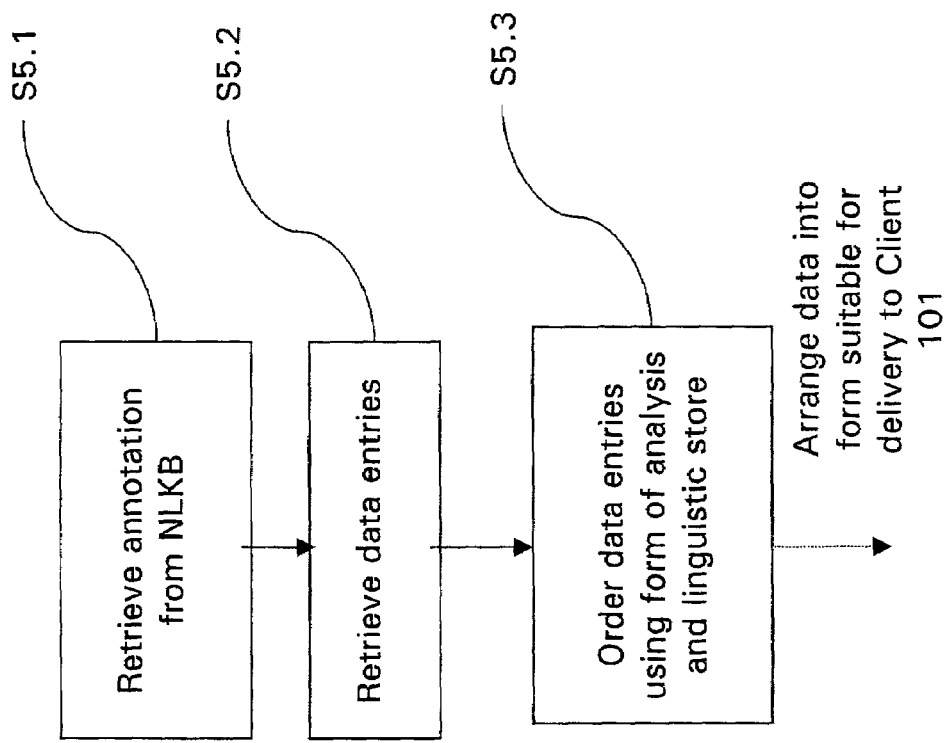
FIG. 5 is a flow diagram of further query processing performed by the analysing means of FIG. 3.

This process can be seen with reference to FIG. 5 of the accompanying drawings:

S5.1 Identify annotation in NLKB 201 for each matched annotation in the index 205 in order of occurrence in the index list;

S5.2 Retrieve a corresponding data entry 202 from the NLKB 201 by linking means 207 between the annotation 204 and data entry 202. The linking means 207 may be a pointer;

S5.3 Order some or all of the matched data entries using the form of analysis and discourse information from the linguistic store 300.

FIG. 3 also shows a dialogue store 305, for logging questions asked by the user, together with the responses that have been given by the system. Each time a question is asked and a response is given by the system, the question and corresponding response is returned, and the Dialogue Store 305 is updated accordingly.

The Dialogue Store 305 may also contain information about the known or implied interests or preferences of the user. For example, if the user has asked several questions of the form "Who manages X", it may be inferred that in the answer to a subsequent question "Tell me about Y", information about the manager of Y should be featured prominently, for example by positioning it near the start of the response. The fact that the system keeps a log of the dialogue between the user and the system means that once the user has asked about subject "X", the user can use the indefinite article "it" and similar linguistic constructs when he asks further questions. This function is performed by the query analyser 302, which resolves the subject of "it" by referring to the dialogue store 305. This means that once the subject is introduced and understood by the system the user is not required to provide any more information about the subject than he would if communicating with another human.

This may be illustrated by the following example:

First Question: "What is ACR"

Response

Second Question: "Who manages it"

Response

The system knows that "it" refers to "ACR" because ACR was the subject of the last communication. In practice queries from a number of different users may be interleaved in time, and a cookie[1] or other mechanism may be used to identify individual users. This example also illustrates a conversational style, generally known in the art as a "Chatterbot" (first Chatterbot was "ELIZA": by Joseph Weizenbaum), adopted in the first embodiment of the present invention.

The generator 303 combines the entries generated at step S5.4 using information from the dialogue store 305, and this data is used to create a suitable response for transmission to the user.

[1] Server data held on the client

Each of the data entries includes information that is specifically relevant to the annotation linked thereto, for example:

| ANNOTATION | DATA ENTRY |
| --- | --- |
| Advanced Cosmology Research | Futuristic research establishment |
| Advanced Cosmology Research, location | ACR is located at the North Pole |
| Advanced Cosmology Research, function | ACR is charged with defending BT against alien attack |
| Advanced Cosmology Research, manager | The manager of ACR is Fred Bloggs |

If a query "Tell me about ACR" were to be entered by a user, then the generator 303 would, following the process described above, retrieve all of the data entries corresponding to ACR and its sub-categories. Thus the response that the user sees is a synthesis of smaller reusable pieces to create a flow of information answering their query. In some instances, e.g. when the question is more specific—"Who runs ACR"—the system will only return a short piece of text. The response therefore depends on the number of annotations that the system finds matches the question posed by the user.

Data Input:

The data populating the NLKB 201 typically has been entered manually by an "author". Thus the entries are assumed to correlate extremely well with the annotations because they have been entered using the reasoning of humans. This contrasts to many systems where information has been automatically extracted from existing documents, such as the Applicant's co-pending European patent application number 97302616.4 discussed above. In these cases subsequent processing is required to determine the relevance of, and the relationship between, the extractions. This latter step is crucial if such systems are to be useful, as the whole point of systems is to present relevant information to the user with a reduced overhead. If the information extracted is not relevant, or the relationship between extractions cannot be quantified, then the system is less than optimally useful.

Text is entered by the user using a suitable application (described later) running on the client 101. The text is in the form of a data entry 202 and an annotation 204, where the form of the annotation 204 is constrained to the encyclopedia form discussed above. The entries are submitted via the client terminal 101 to the server 105 and stored in the NLKB 201, and the annotations are also stored in the second data store 205, as described above.

The linguistic store 300 may be a database comprising part of the storage device 106 on the server computer 105, or may be a separate data store located either local to or remote from the server 105. The functions performed by the query analyser 302, the pattern matcher 304 and the generator 303 may be written in the Perl programming language. However, it is understood that the use of Perl is inessential to the invention. The input mechanism allows authors, who are populating the database with new entries, to enter the corresponding annotation without having to conform to any programming standards. Clearly this is an advantage as entries may be provided by people who have had no programming experience at all, and for whom entering text would otherwise require negotiation of a technical hurdle which is incidental to the function of the system itself.

Second Embodiment

Figure 6:
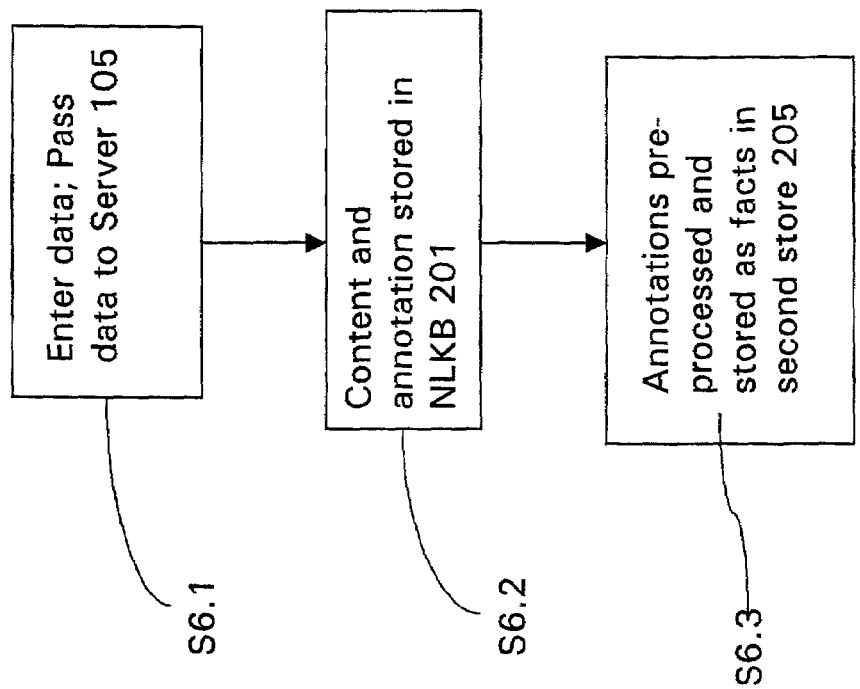
FIG. 6 is a flow diagram of processing a new input according to the second embodiment.
Figure 7:
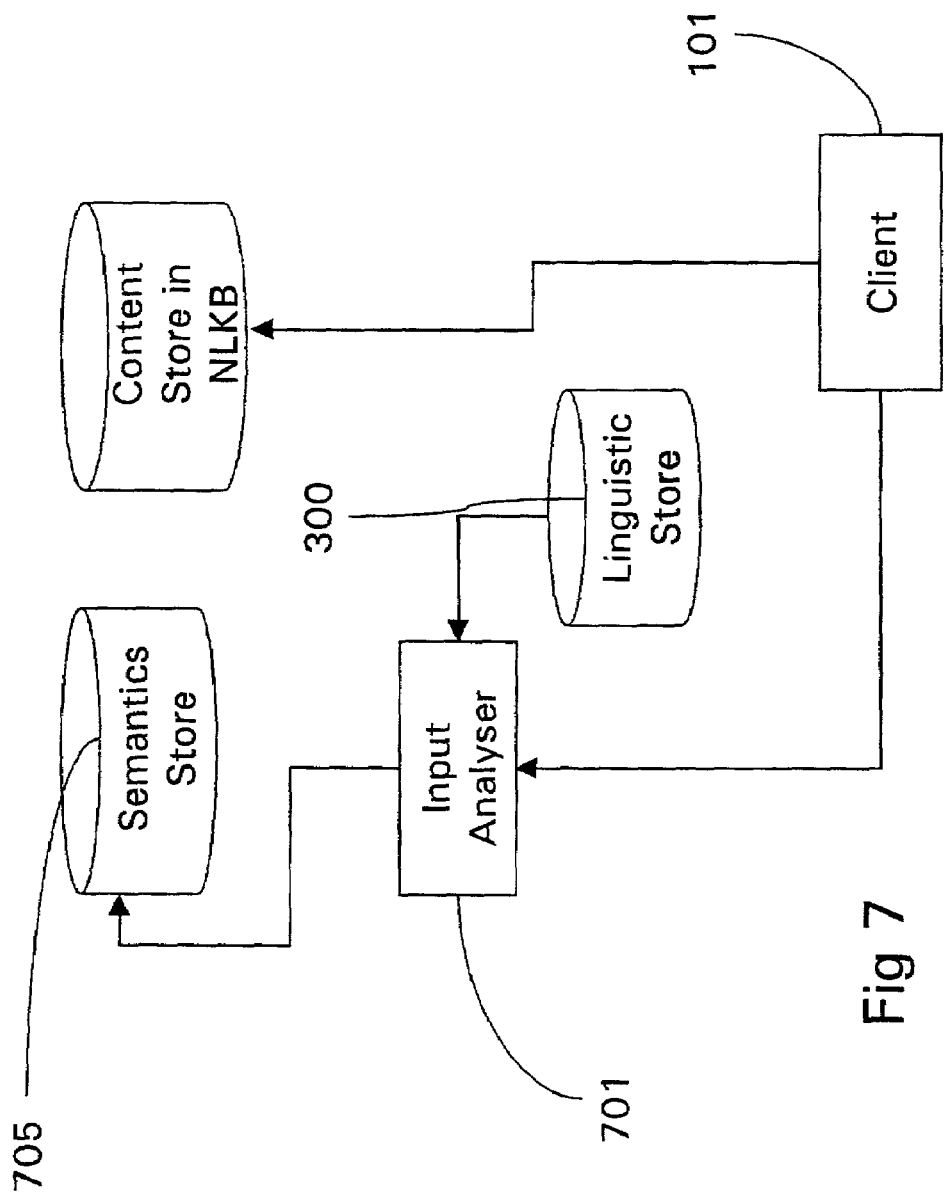
FIG. 7 is a block diagram of the apparatus of FIG. 1, showing the components comprising the analysing means according to the second embodiment for data input.
Figure 8:
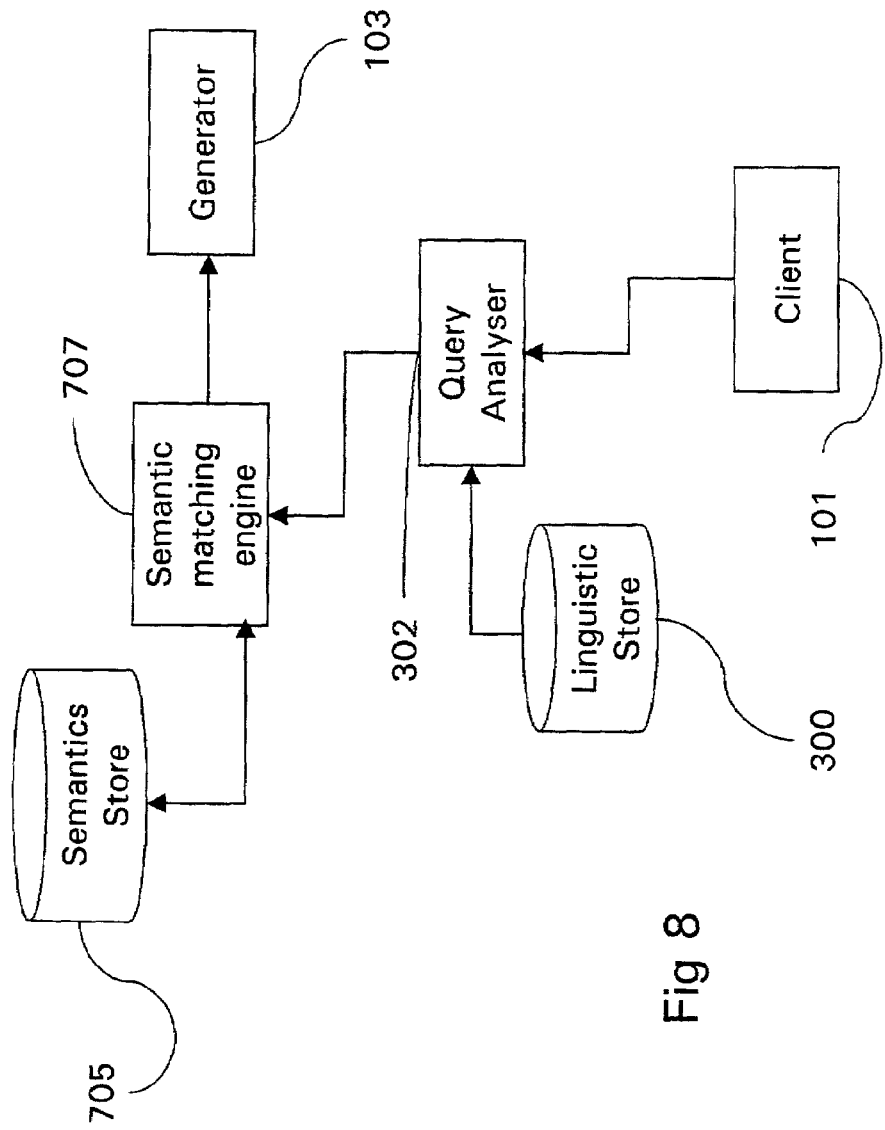
FIG. 8 is a block diagram of the apparatus of FIG. 1, showing the components comprising the analysing means according to the second embodiment for query analysis.

FIGS. 6 to 8 show data input according to a second embodiment of the present invention generally similar to that of FIGS. 1 to 5 in which like components have been given like reference numerals and will not be described further in detail.

Data Input:

In this embodiment, the annotations 204 are processed for their meaning as illustrated with reference to FIGS. 6 and 7 in the following steps:

S6.1 Submit an entry, which is composed of two parts, a content 202 and an annotation 204, via the client terminal 101 to the server 105;

S6.2 Store content 202 and annotation 204 in the NLKB 201;

S6.3 Pre-process the annotations 204 to analyse their semantic and syntactic content, and store this as Prolog facts in a second data store 205. Each semantic representation is linked to its content (data entry) by a suitable means (eg a unique identifier). The pre-processing of the annotations may be performed by an Input Analyser 701, which uses linguistic information from the Linguistic Store 300. As described in the context of the first embodiment, the store 300 may include information about morphology, synonyms, hypernyms/hyponyms, etc, and a resulting semantic representation of the annotation is stored in the second data store 205 which may be a Semantic Store 705.

The linguistic store 300 may include a lexical database, which includes an entry for each meaning of each word in the language (or all languages) input to the apparatus. Each entry for each meaning includes a definition of the meaning the word in the, or each, language. The entries may be hierarchically ordered, such that the uppermost layer of the hierarchy consists of entries for the three categories of entities, states of affairs and modifiers. Each category is then further subdivided.

An example of the semantics produced by the Input analyser 701 is a set of semantic terms (semterms), which together make up a semantic graph, sometimes referred to as an "entity/relation" or node/link" graph. These semterms can alternatively or additionally express a Conceptual Graph, which is a particular type of semantic graph, as described in John F Sowa: "Knowledge Representation", Brooks/Cole, 2000. For example, concepts in Conceptual Graphs, which are typically shown as rectangles, correspond to entities (e( ) semterms) and States of Affairs (evt( ) semterms), while conceptual relations in Conceptual Graphs, shown as circles, correspond to relations (ro semterms).

Each semterm can be thought of as a Prolog fact and the first argument in each semterm is its identifier, which in most cases is represented by an integer (see example below).

Data Query:

FIG. 8 of the accompanying drawings shows an arrangement of the components comprising the analysing, comparing and retrieving means 102, 107, 103 according to the second embodiment of the present invention, and their function is explained with reference to the following steps (not shown in a Figure):

Enter queries via the client 101 as described in the first embodiment;

Analyse queries using the query analyser 302 shown in FIG. 8 for their semantic content according to the process described at step S6.3 above {which was performed by input analyser 701, accessing the linguistic store 300}. This results in query semantics having uninstantiated elements;

Instantiate these uninstantiated elements against the facts previously stored in the Semantic Store 705 (step S6.3) first shown in FIG. 7. The process of instantiation is carried out using a semantic matching engine 707 and the process includes matching query semantics against information stored in the store 707, and identifying an entry in semantic store 705 therefrom.

As the semantic store 705 contains pre-processed annotation elements 704, once the queries have been instantiated against the same 704, a corresponding annotation element can be identified from the NLKB 201. The data entry may thence be retrieved from the database 201 by the generator 303 for display to the user at the client terminal 101. If, as described in the first embodiment, there is more than one annotation returned in response to a query, the corresponding entries are retrieved by the generator 303 for display to the user. Also, as described with reference to the first embodiment, information about the form of the query may be determined by the Query Analyser 302 and used to influence the semantic matching and the ordering of the entries in the generator output.

By way of illustration, an example of the semantic analysis of an annotation and its use in a subsequent query will now be given.

In this example, it is assumed that there is a content data entry (referred to below as a pagelet) which describes a new network product called AcmeNet which has recently been introduced by the company Acme. Annotations are expressed in a simplified form of English (or other language) which is designed to be reasonably unambiguous. An appropriate annotation, and a semantic analysis of the annotation, is shown below.

| Annotation | Semterms |
| --- | --- |
| Acme is a company. | isa('Acme',company), |
| Acme produces AcmeNet. | evt(149401,produce), |
| AcmeNet is a kind of network. | r(149402,agent,149401,149403), |
| P describes AcmeNet. | r(149404,patient,149401,149405), |
| | e(149403,'Acme'), |
| | e(149405,'AcmeNet'), |
| | ako('AcmeNet',network), |
| | evt(149406,describe), |
| | r(149407,agent,149406,p1494), |
| | r(149408,patient,149406,149409), |
| | e(p1494,pagelet), |
| | e(149409,'AcmeNet') |

The input Analyser 701 uses a semantic grammar (contained in the Linguistic Store 300) to produce a semantic representation of the annotation. This consists of a number of semantic terms (semterms) as shown. As stated above, the semterms together make up a semantic graph, sometimes referred to as an "entity/relation" or "node/link" graph.

The terms is a( ) and ako( ) are used to position new entities within a semantic hierarchy. In this case, it is known that Acme is an instance of a company and that AcmeNet is a specialisation of a network. One use of this hierarchy information will be illustrated later.

The other terms implement the semantically meaningful elements described earlier. The first argument in these terms is usually an automatically-generated unique identifier, which may be referenced in other terms, thereby constructing a semantic graph:

Entities are represented by e( ) terms;

States of affairs are represented by evt( );

Terms also exist to represent modifiers, both of entities (usually corresponding to adjectives) and of states of affairs (usually corresponding to adverbs), though these are not included in the example above. Other terms allow temporal and modal aspects of verbs to be represented.

The r( ) terms describe the relation between states of affairs, entities and modifiers. For example, the $2^{nd}$ through $6^{th}$ terms above say that there is a "produce" event whose agent role is fulfilled by Acme and whose patient role is fulfilled by AcmeNet—"Acme produces AcmeNet".

The special symbol "P" in the annotation represents the current content data entry (pagelet), and the corresponding semterm contains the value "pagelet".

Figure 9A:
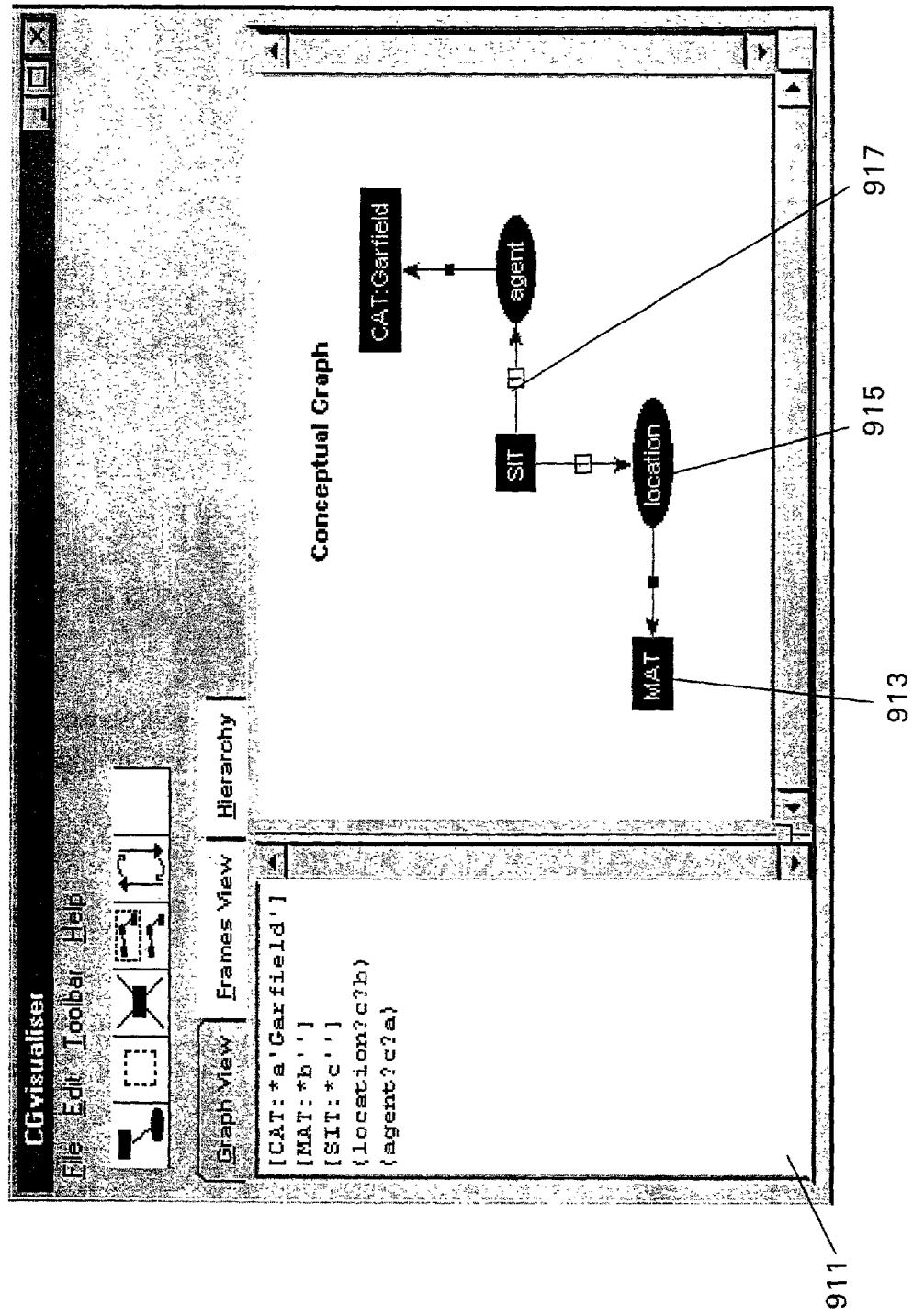
FIG. 9a is an illustration of an input display for entering annotations according to the second embodiment.

A graphical method of entering annotations directly as Conceptual Graphs could also be used. This might involve the use of a graphical editor application, or a Java applet for ease of integration with WWW pages. When the user enters annotations directly using Conceptual graphs, the concepts and conceptual relations are easily translated into semterms, because, as stated above, concepts in Conceptual graphs correspond to entities (e( ) semterms) and States of Affairs (evt( ) semterms), while the conceptual relations in Conceptual graphs correspond to relations (r( ) semterms). An example of a suitable graphical editor is shown in FIG. 9a of the accompanying drawings. Referring to FIG. 9a, an analysis display area 911 is provided, in which the program comprises tools to draw concepts 913, conceptual relations 915 and graphical linkages 917 (shown as arrowed lines) indicating the connections between the concepts and conceptual relations. In the example given, the user has entered names of the concepts and conceptual relations relating to the phrase "a cat Garfield is sitting on a mat" into their respective boxes.

Using either the program 911, or by entering the annotation in natural language and analysing it as described in the Acme example above, once the annotation has been processed into a list of semterms, these are asserted into the semantic store 705, whereupon they can be used to answer queries.

By way of illustrating how a query may be handled, it is assumed that the above semantic terms have been asserted into the semantic store 705, and that a user has entered the query:

"Who produces AcmeNet".

either in natural language or as a conceptual graph.

This query will be processed to produce the following semterms.

| Request | Semterms |
|---------|----------|
| Who produces AcmeNet? | evt(E,produce),<br>r(Re,agent,E,Ag),<br>r(Rp,patient,E,Pa), |

| Request | Semterms |
|---------|----------|
| | e(Ag,X),<br>e(Pa,'AcmeNet') |

Arguments beginning with a capital letter correspond to Prolog variables. When the semterms corresponding to the query are converted into a Prolog clause and executed, these arguments will be instantiated with the following values:

E=149401

Re=149402

Ag=149403

Rp=149404

Pa=149405

X='Acme'

The answer to the question is given by the value to which X becomes instantiated—'Acme'.

Similar processing is used when a content data entry is to be retrieved:

| Request | Semterms |
|---------|----------|
| Tell me about AcmeNet | evt(E,describe),<br>r(Re,agent,E,P),<br>r(Rp,patient,E,Pa),<br>e(P,pagelet),<br>e(Pa,'AcmeNet') |

Instantiations:

E=149406

Re=149407

Rp=149408

Pa=149409

P=p1494

The value of P, 'p1494' is the unique identifier for the appropriate entry in the content store.

Requests may also make use of the semantic hierarchy composed by the is a( ) and ako( ) terms:

| Request | Semterms |
|---------|----------|
| What types of network are there? | ako(X,network) |

Instantiations:

X='AcmeNet'

Where multiple answers exist (as will probably be the case in the last example), Prolog's backtracking mechanism can be used to find them.

From the examples above, it should be evident how more complex requests, such as "Tell me about the companies that produce networks" are satisfied.

In practice, additional indexes for the semterms may be constructed in accordance with standard programming practices to increase the efficiency of accessing the Prolog database required by the above. The Prolog mechanisms involved are explained in introductory textbooks on the language, for example Clocksin and Mellish, "Programming in Prolog", Springer-Verlag, 1987.

Given the amount of information that the system accumulates though the annotations of the entries, there is considerable scope for using inference from things that the system knows already. A simple example of this is that if C produces X then C must be a company. The following semantics facts illustrate this process:

Question: "Do universities have departments?" the system might find the semantics isa(University of Edinburgh, university)
    isa(Computer Science Department, department)
    e(U,University of Edinburgh)
    e(D,Computer Science Department)
    r(_,hasPart,U,D)
    evt(E,work at)
    e(P,Joe Bloggs)
    r(_,agent,E,P)

available as facts in the semantic store 705, and answer yes, by example. Prolog's theorem proving is well suited to this sort of reasoning.

As described above, the processes performed by the input analyser 701, together with the decoding and retrieving processes described above, may be implemented in the Prolog programming language. Prolog is well suited to performing analysis of text according to pre-defined rules encapsulating semantics and syntax of an input string, and the storage of semantic facts. However, other programming languages such as Java and storage methods such as relational databases could be used to perform this task. In comparison to the first embodiment, where inputs are not analysed for their semantic content and authors can enter annotations in an encyclopaedia form, authors of inputs have to present their annotation in a form that may be resolved by Prolog methods, and thus the load on authors is higher.

The first and second embodiments discussed above make use of distinctly different methods both for handling annotations that are stored in the database 201 and for processing queries in order to identify annotations relevant to the queries. However, in certain situations it may be beneficial to combine features of both embodiments in order to provide a system that can resolve a wide variety of queries. For example, some pre-processing of the annotations of the first embodiment may be required in order to standardise or index the annotations in some way so as to speed up query processing. Clearly if some processing can be performed in advance it will speed up the response time for the user. Also the level of sophistication of queries that may be handled with the first embodiment, in which queries and pattern matching are handled in Perl, may be limited. In this situation, firstly the semantics of the query may be matched against entries that have been pre-processed for their meaning, as described in the second embodiment. Secondly, if any part of a query cannot be resolved according to step S4.3.2, then the Perl process may submit the part to be resolved to a Prolog process that is waiting at a socket[2] for input. Thirdly, as described above with reference to the second embodiment, Prolog allows relationships to be inferred between stored annotations, which provides a further resource for resolving queries. Thus the query may be submitted to a Prolog process for resolution using inference.

[2] A socket is a method of communicating between a client and a server machine, or for communicating between processes running on the same machine. A socket is defined as a communication endpoint whose address is given by an IP address of a server and a port address of the application that resides on that server. In the context of the present invention, the socket connection could be between two processes (both within the remit of server applications 407) running on the same machine, or between two separate servers: one running Perl processes and one runnning Prolog processes.

The results of the Prolog process would be passed back to the Perl process for further processing. In terms of the components detailed in FIG. 8, the Query analyser 300 would comprise Perl and Prolog processes in the manner described previously.

Discourse Processing:

Operation of the present invention is controlled by input from the user according to both embodiments described above. The selection and sequencing of the data entries returned to the reader depends both on general principles of discourse generation which may be stored in the Linguistic Store 300 and on the preferences of the reader, either explicitly expressed or inferred from previous requests.

A human author composing a written article will usually attempt to present the most important information first, and to order different topics so that there is a logical flow from one topic to another. It is sometimes said that an article is a "frozen conversation" between the author and an imaginary reader, where the author has imagined the questions which the reader might ask while reading each paragraph, and then answered those questions in subsequent paragraphs.

One way of achieving similar results automatically is to store a number of templates, which give a suitable default ordering for the entries, in the Linguistic Store 300. These may be classified according to the type of the entity to be described (eg company, person, process, etch and invoked as required. The "Form of Query" discussed at step S4.2 above would also be instrumental in determining the selection and ordering of the data content entries.

Where there is additional information about the current preferences or intentions of the reader, these default orderings may be overridden. An example of inferring the current preferences of the reader and using them to influence the selection and ordering of the returned information has already been given.

The published literature on discourse analysis teaches a number of additional techniques that could be incorporated into the system, especially in the case of the second embodiment where relatively sophisticated language processing is available.

Third Embodiment

Figure 9B:
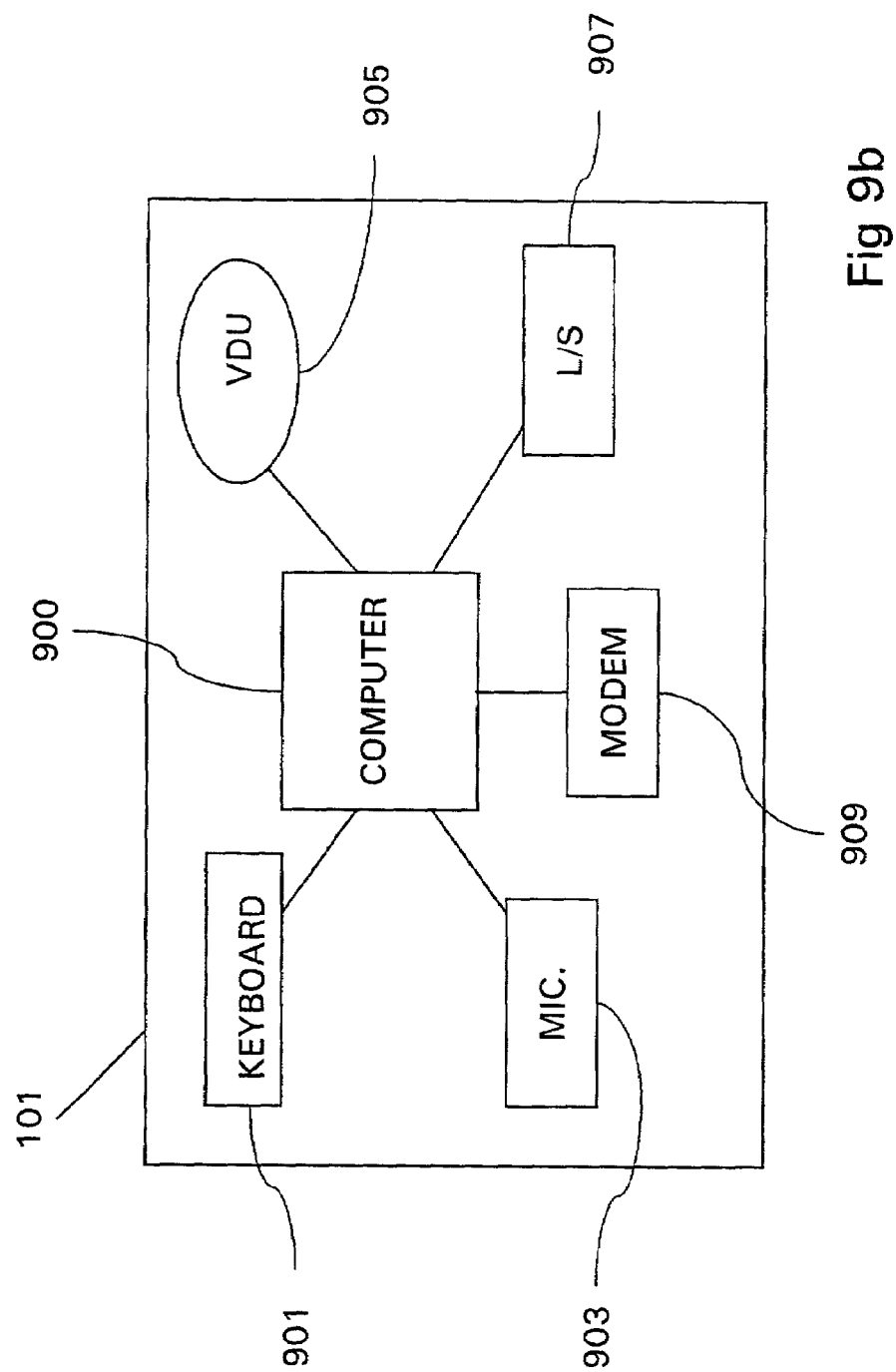
FIG. 9b is a block diagram showing a terminal utilised in a third embodiment of the invention and corresponding to that shown in FIG. 1.

Input of Data:

In earlier embodiments, the data entries are typed into the terminal 101 as text via the keyboard 901 shown in FIG. 9*b*. In the present embodiment the terminal 101 is provided with a microphone 903, and the input text is dictated and transliterated by a speech-to-text conversion program, such as ViaVoice™ available from IBM Inc.

The input speech is reproduced as text in a text input area of the screen 905, and in other respects the present embodiment operates as described above.

It is advantageous to provide the speech recognition at the terminal 101, where it is possible to train on the voice of the individual user, rather than centrally. Also, since text rather than audio is uplinked, the required uplink bandwidth is kept low.

Furthermore, speech recognition requires significant computer processing and it is advantageous if this is provided on individual users' machines rather than on a central server.

On the other hand, providing the generation centrally avoids the need to store multiple rules databases locally at terminals.

In this embodiment, the terminal 101 may also comprise a text to speech program arranged to synthesise speech from the text received from the computer 900 to provide audio output via a loudspeaker 907.

If an applet is running on a browser installed on the client terminal 101 (see below), the applet may also be arranged to generate a visual display to represent the output data. For example, a representation of a human face, or an entire human head, animated in synchronism with the output speech as described in our earlier application EP-A-225729, or a sign language display comprising an animated representation of a pair of hands generating sign language (for example British or American sign language) from a text to sign language converter program. This latter embodiment is particularly advantageous for those with hearing difficulties.

Fourth Embodiment

Multilingual Querying of Data:

In the above-described embodiments, the description assumes that the generated text is in the same language as the originally input text. However, the analysis of the input text, into entities, state of affairs and modifier elements, results in a representation of the input statements which is substantially language-independent. The present embodiment utilises this to handle requests and to generate responses in multiple languages by providing a means for storing content data, annotations and semantics derived from these annotations in multiple languages, together with a means for linking similar content data entries across languages.

The processing of multilingual requests will be explained with reference to the first embodiment; and these components may similarly be applied in order to effect multilingual querying for the second embodiment.

FIG. 10 shows a multilingual content data store 201 which in accordance with the description of the first embodiment is a database comprising pre-entered data entries 1002$a,b$ . . . in languages a,b, together with a list 1004$a,b$ . . . of annotations 1006$a,b$ . . . that correspond to these entries. The list 1004$a,b$ . . . of annotations is also stored in a second data store 1008$a,b$ . . . . The Linguistic Store 300 introduced in FIG. 3 is extended to allow it to hold linguistic information which differs between languages, and the Linguistic Store 300 may be further extended to provide access to aspects of linguistic information that are unique to a particular language and are not directly translatable. The following steps illustrate the fourth embodiment in operation:

When analysing a query entered at the client 101, the Query Analyser 302 first determines the language of the request, either by reading information explicitly entered by the user, or by using one of the known methods of automatic language identification;

The appropriate set of linguistic data from Linguistic Store 300 is then accessed, allowing the Query Analyser 302 to produce an appropriate matching pattern;

This pattern is then matched against the appropriate language index 1008$a,b$ . . . , and the corresponding data entries 1002$a,b$ . . . are retrieved by the generator.

The fourth embodiment also enables a response to be presented to the user in a different language from the one in which the request was made: the user may specify a desired output language upon submission of the query, which will effect automatic selection of a language index 1008 and corresponding data entry 1002. This may be carried out by a multilingual index 1012, which relates annotations in different languages having a substantially identical content i.e. a response to request, which is made in language a, is provided in language b. The following steps illustrate this additional functionality:

A query is processed as described for the first and/or second embodiments in language a, and matching annotations from 1008$a$ are obtained;

The multilingual index 1012 is now used to find the corresponding annotations in language b in 1008$b$;

The data entries from 1002$b$ are then retrieved, and processed as described above, for earlier embodiments, by the generator, giving a response in language b.

The above description assumes that the data entries and annotations are entered manually. It may also be advantageous to have content and annotations translated either automatically or semi-automatically. Our earlier application number PCT 97186887.6, filed on 8th Aug. 1997 (and corresponding PCT application PCTIGB98/02389 filed on 7 Aug. 1998), discloses a method of language translation that is particularly suitable for this purpose.

Implementation

The following description presents possible configurations of the client 101 and server 105 components shown in FIG. 1, together with details of applications that may be used to provide the user interface and effect communication between the client and server computers.

Figure 11:
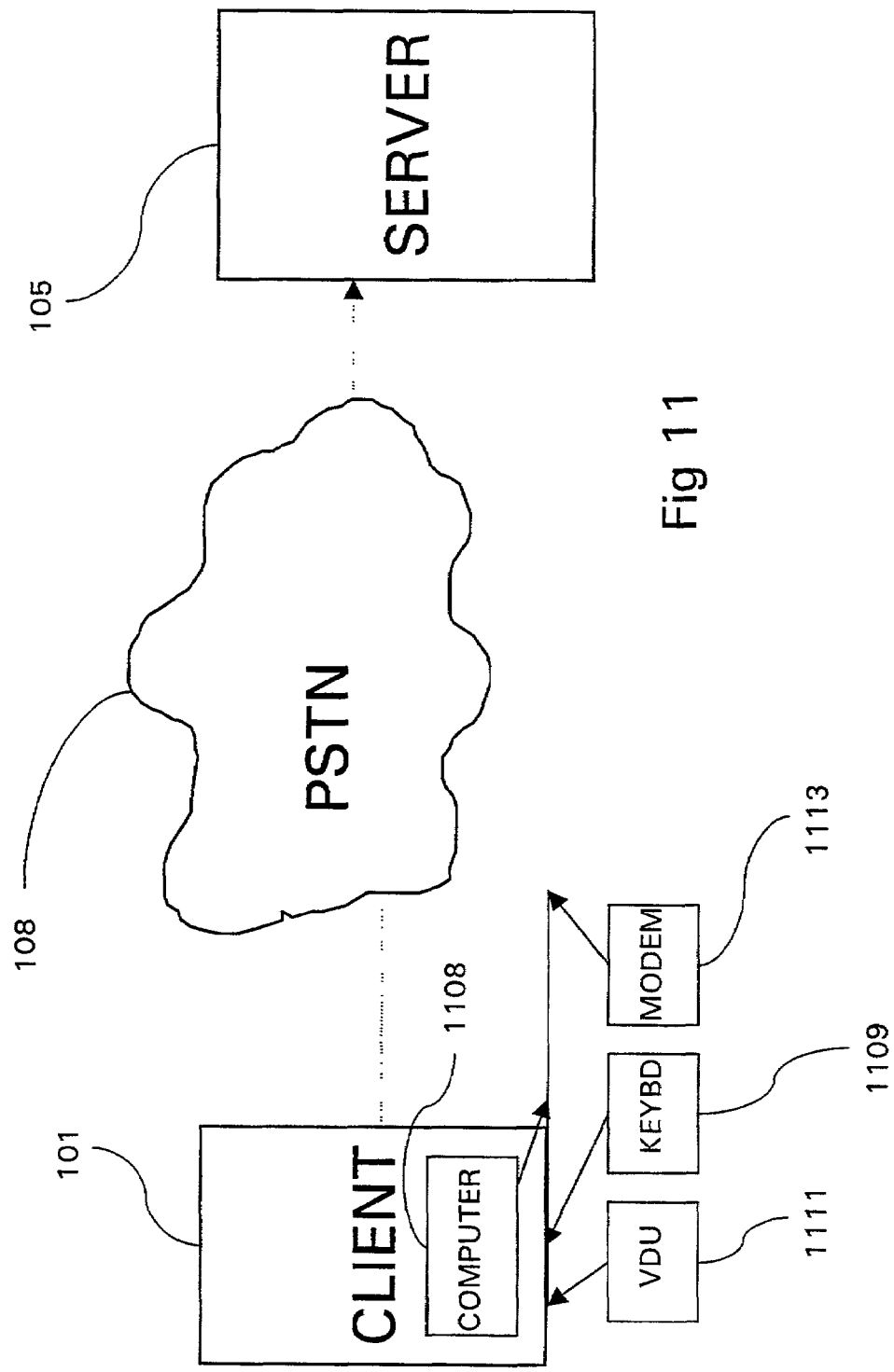
FIG. 11 is a block diagram of the client/server arrangement shown in FIG. 1.

Reference to FIG. 11 of the accompanying drawings, the client terminal 101 comprises a keyboard 1109, a VDU 1111, a modem 1113, and a computer 1100 comprising a processor, mass storage such as a hard disk drive, and working storage, such as RAM. For example, a SUN(™) work station or a Pentium(™) based personal computer may be employed as the client terminal 101.

Figure 12:
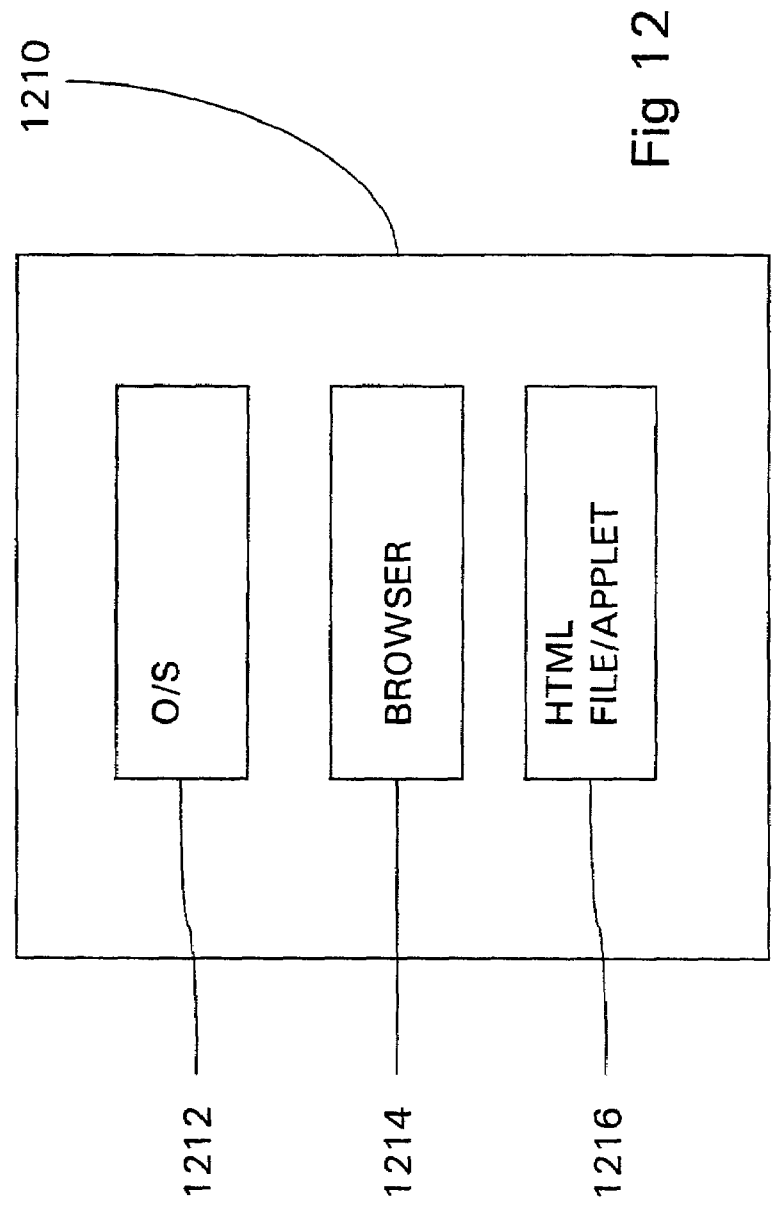
FIG. 12 is a block diagram showing in greater detail the processes present in the client terminal shown in FIG. 11.

Referring to FIG. 12, an operating control program 1210 comprising:

(i) an operating system 1212 (such as Windows™);
(ii) a browser 1214 (such as Internet Explorer™); and
(iii) an application 1216 (such as a Java™ applet, or a plain HTML file), which is designed to operate within the browser 1214, is stored within the client terminal 101 (e.g. on the hard disk drive thereof). The function of the operating system 1212 is conventional and will not be described further. The function of the browser 1214 is to interact, in known fashion, with hypertext information received from the server 105 via the PSTN 108 and modem 1113. The browser 1214 thereby downloads the applet, or plain HTML file 1216, at the beginning of the communications session, as part of a hypertext document from the server 105.

The function of the HTML file or applet 1216 is to allow the input of information for uploading to the server 105 by the user, through the browser 1214.

Figure 13:
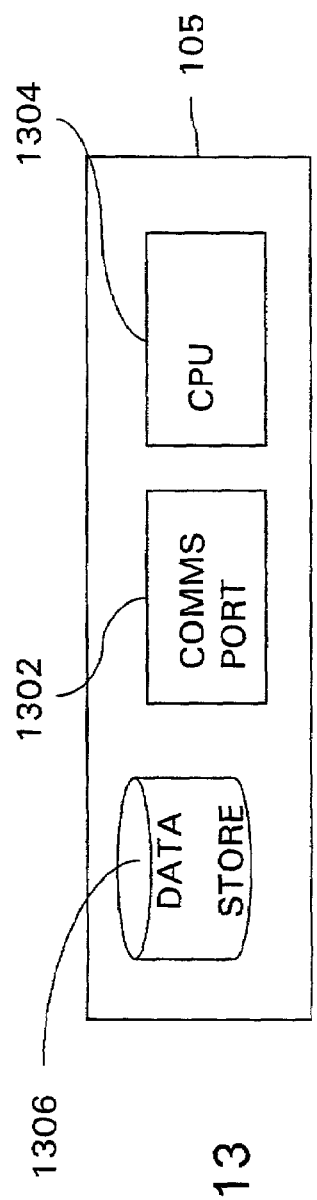
FIG. 13 is a block diagram showing in greater detail the components comprising the server shown in FIG. 11.

Referring to FIG. 13, the server 105 comprises a communications port 1302 (e.g. a modem); a central processing unit 1304 (e.g. a mainframe computer) and a mass storage device 1306 (e.g. a hard disk drive or an array of disk drives).

Figure 14:
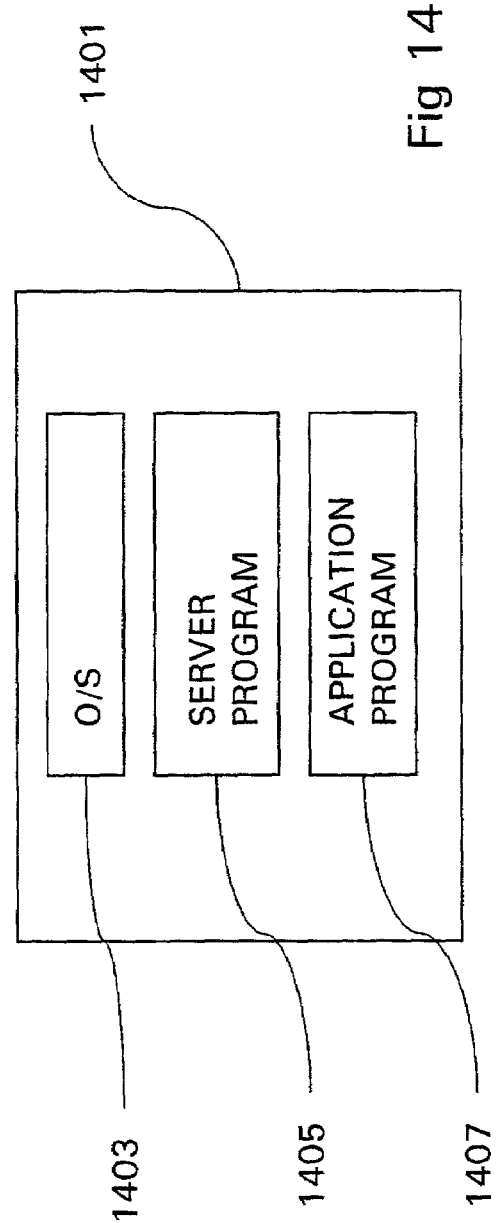
FIG. 14 is a block diagram showing in greater detail the processes present in the server of FIG. 13.

Referring to FIG. 14, the server 105 comprises an operating program 1401 comprising an operating system 1403 such as Unix(™), a server program 1405 and an application program 1407. The operating system is conventional and will not be described further.

The function of the server program 1405 is to receive requests for hypertext documents from the client terminal 101 and to supply hypertext documents in reply. Specifically, the server program 1405 initially downloads a document 1216, possibly containing the applet, to the client terminal 101. The server program 1405 is also arranged to supply data to and receive data from the application program 1407, via, for example, a cgi.bin mechanism or Java Remote Method Invocation (RMI) mechanism. The application program 1407 receives data (via the server program 1405) from a client terminal 101, performs processing, and may return data (via the server program 1405) to that client terminal for display.

Figure 15:
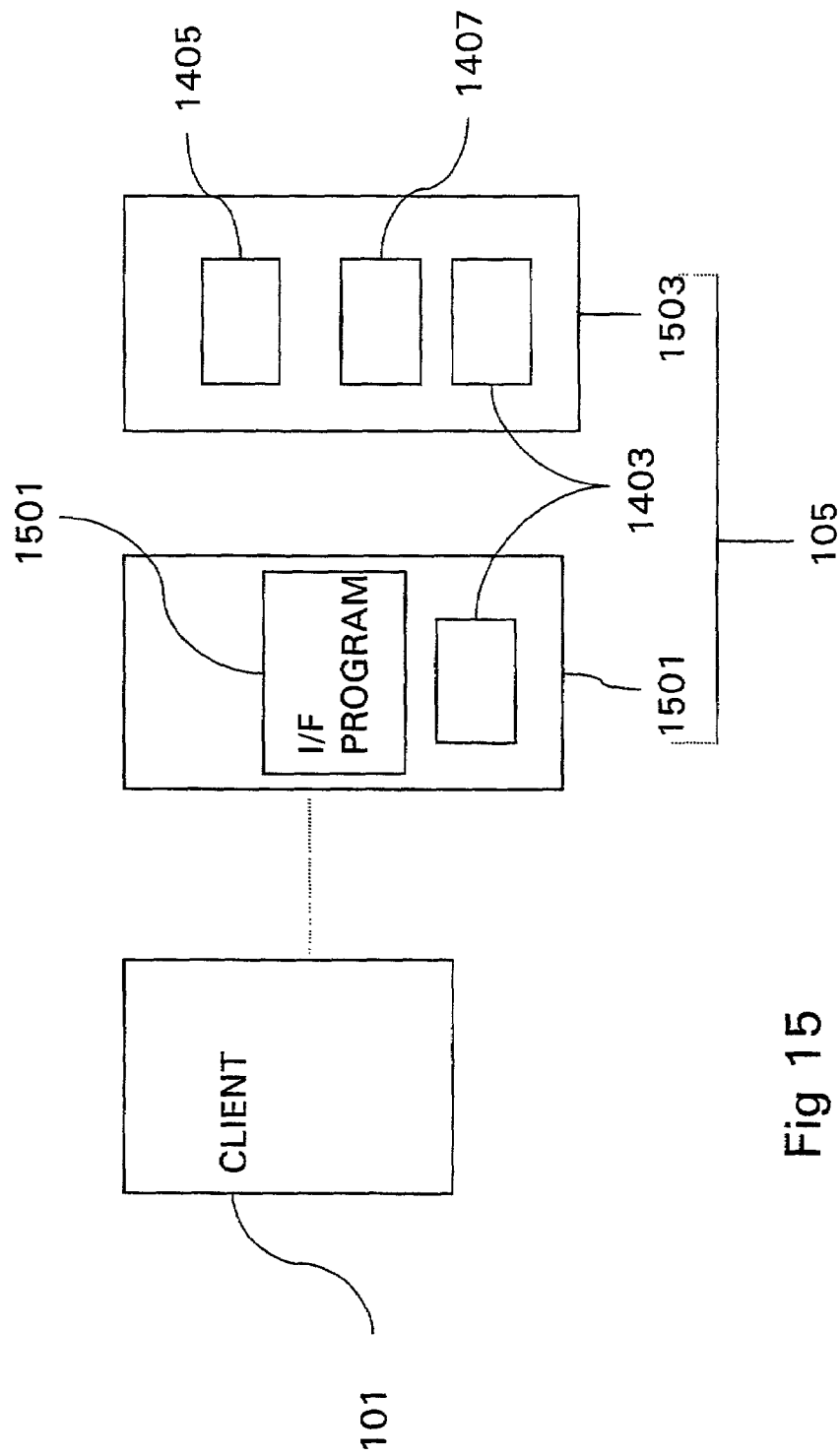
FIG. 15 is a block diagram showing in greater detail the processes present in the server of FIG. 13 for an alternative configuration of the client/server arrangement shown in FIG. 1.

In an alternative configuration, the server 105 may comprise a web interface server, known as a WWW server 1501 together with a data server 1503, as shown in FIG. 15. In this configuration, the WWW server 1501 comprises an interface program 1505 for making calls to programs 1405 implemented on the data server 1503, and for retrieving the result of such a call. This result may be delivered by the WWW server 1501 for downloading onto the browser 1214 on the client terminal 101 for display. The function of the data server 1503 is to store data that is received from the application program 1407, and to process data in accordance with the calls made to the server program 1405. The application and server programs 1407, 1405 may be stored on the data server 1503.

The responses that are presented to the user at the client terminal 101 in the browser 1214 may either be via HTML, or via a Java applet. The latter configuration could involve the applet communicating directly with the application programs 1407, and receiving messages therefrom, and the former configuration could involve loading a relevant HTML page each time a response is received from the server 105.

There are further client/server arrangements that may be utilised to work the present invention, including any combination of the following:

Providing access to the store 106 remotely via the internet 110 shown in FIG. 1;

Locating the store 106 remote from the server 105; and

Storing the functional components 102, 105, 107 on a carrier remote from the server 105.

As stated earlier in the description, the data entries may include any information whether presented in words, images or computer code for example, and would include a computer program, HTML pages, electronic mail documents, text files, word-processed documents, or multimedia objects. Thus if an entry includes a link to an HTML page, in order to access the page, the server computer 105 would have to be connected to a server at the corresponding Universal Resource Locator (URL). This would be facilitated by a connection between the server 105 and the internet 110 as shown in FIG. 1.

In particular, data entries could be specifically created for guiding a user through a series of procedural steps—for example, presenting advice to a user when buying a piece of equipment, such as a scanner. There are configuration and compatibility issues that affect selection of equipment, particularly when there is a proliferation of technical jargon with which the user is unfamiliar. Typically users do not consult anyone for advice, and/or can receive conflicting advice, resulting in a purchase of an incompatible device or a device that is inappropriate for his needs. In the example given, of buying a scanner, the user may need to know (but is aware that he needs to know) port type, compatibility with operating systems, cabling requirements etc. in order to select an appropriate scanner. Clearly the user may need to check certain configuration parameters associated with any co-operating equipment, and unless he is aware of these requirements, even if he interacts with a helpful salesperson, he may have insufficient information to make a successful purchase.

Embodiments of the present invention may thus include a plurality of entries relating to the topic of "scanners", each of which alerts the user to an issue relating to his choice of scanner. There may also be entries that guide the user through installation of the scanner, once it has been purchased.

Many modifications and variations fall within the scope of the invention, which is intended to cover all permutations and combinations of the individual modes of operation of the various assistants described herein.

As will be understood by those skilled in the art, the invention described above may be embodied in one or more computer programs. These programmes can be contained on various transmission and/or storage mediums such as a floppy disc, CD-ROM, or magnetic tape so that the programmes can be loaded onto one or more general purpose computers or could be downloaded over a computer network using a suitable transmission medium.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of presenting information to a user in respect of a query, the method comprising:
   (i) decoding the query into one or more semantically meaningful query elements;
   (ii) accessing annotation elements stored in a first data store;
   (iii) comparing a semantically meaningful query element from step (i) with the annotation elements so as to identify at least one annotation element that matches the semantically meaningful query element;
   (iv) retrieving a plurality of data entries corresponding to the identified annotation element(s), each of the plurality being stored in a second data store;
   (v) presenting the plurality of retrieved data entries to the user in accordance with at least one of a number of templates, which give an ordering for the entries on the basis of their respective annotation elements, and which are classified according to the type of entity to be described.

2. A method according to claim 1, wherein ordering of the data entries also depends upon discourse criteria and preferences of the user.

3. A method according to claim 1 including the step of monitoring and storing the queries entered by the user.

4. A method according to claim 3 wherein the preferences of the user are identified from the said stored queries entered by the user.

5. A method according to claim 1, in which the annotation elements are arranged in accordance with semantic relationships between annotation elements, or lexical relationships between annotation elements.

6. A method according to claim 1, in which said comparison step (iii) includes the steps of:
   inputting a semantically meaningful query element into a predetermined rule;
   inputting an annotation into the predetermined rule; and processing the rule.

7. A method according to claim 1, further comprising:
   analyzing the query so as to extract:
   a subject of the query;

a property of the query;

retrieving at least one predetermined sets of queries and responses from a further data store, each of which set has at least one property and at least one subject identifier;

comparing the extracted subject and property information with the retrieved property or properties and subject identifier(s) so as to identify a predetermined set of queries and responses relating to the query; and automatically submitting the queries comprising the predetermined set for processing according to decoding step (i).

8. Apparatus for processing queries, which queries may be expressed in natural language, the apparatus comprising:

decoding means for decoding a query into one or more semantically meaningful query elements;

accessing means for accessing data storage, which data storage includes at least one annotation element and one or more corresponding data entries;

identifying means for identifying annotation elements in accordance with the semantically meaningful query elements;

retrieval means for retrieving at least one data entry corresponding to each identified annotation element;

a store arranged to store discourse criteria and preferences of the user identifying presentation of data entries; and the retrieval means being arranged to present the retrieved data entries in accordance with at least one of a number of templates which determine the ordering of search results based on their annotation elements and which are classified according to the type of entity to be described.

9. Apparatus according to claim 8, wherein respective discourse criteria and/or preferences of the user are stored in the store and wherein ordering of the data entries also depends upon the stored discourse criteria and/or preferences of the user.

10. Apparatus according to claim 9, further comprising user means for loading and modifying data entries in the data storage.

11. Apparatus according to claim 8, wherein the annotation elements are arranged in accordance with semantic relationships between annotation elements, or lexical relationships between annotation elements.

12. Apparatus according to claim 8, in which said decoding means includes a linguistic store comprising lexical, syntactic and discourse information and being accessible by the decoding means for deriving semantically meaningful elements corresponding to the query.

13. Apparatus according to claim 8, including means responsive to queries entered in a plurality of languages.

14. Apparatus according to claim 8, including linking means for linking at least one annotation to at least one data entry in the data store.

15. Apparatus according to claim 8, wherein the data entries include at least one of text, hyperlinks, graphical data, pagelets, computer programs and/or video data.

16. Apparatus according to claim 8, wherein the queries are received from a user via input means.

17. Apparatus according to claim 16, wherein the input means includes at least one of text input and/or speech input means.

18. Apparatus according to claim 8, further comprising:

a further data store comprising a plurality of predetermined sets of queries, each of which has data identifying a property and a subject identifier relating thereto;

analyzing means arranged to analyze the query so as to extract a subject of the query and a property of the query;

means arranged to compare the subject and property information extracted by the analyzing means with the property or properties and subject data stored in the further data store so as to identify a predetermined set of queries relating to the said query; and means arranged to automatically submit the queries comprising the identified set for processing by the decoding means.

19. A computer program storage medium having stored therein a set of instructions to cause at least one computer to perform the method according to claim 1.

* * * * *